US009962893B2

(12) United States Patent
Worden et al.

(10) Patent No.: US 9,962,893 B2
(45) Date of Patent: May 8, 2018

(54) COMBINATION CAP AND WORK SUPPORT SYSTEM

(71) Applicant: Preddis LLC, San Antonio, TX (US)

(72) Inventors: Michael Worden, San Antonio, TX (US); Nathaniel Hallee, Minneapolis, MN (US); George Stickler, Shorewood, MN (US)

(73) Assignee: PREDDIS, LLC, Everett, WA (US)

( * ) Notice: Subject to any disclaimer, the term of this patent is extended or adjusted under 35 U.S.C. 154(b) by 138 days.

(21) Appl. No.: 14/268,056

(22) Filed: May 2, 2014

(65) Prior Publication Data
US 2015/0314925 A1 Nov. 5, 2015

(51) Int. Cl.
| | |
|---|---|
| B65D 41/56 | (2006.01) |
| B65D 51/00 | (2006.01) |
| B65D 25/28 | (2006.01) |
| B65D 43/03 | (2006.01) |
| B65D 55/00 | (2006.01) |
| B65D 41/04 | (2006.01) |
| B65D 83/40 | (2006.01) |
| B29D 99/00 | (2010.01) |
| B65D 41/02 | (2006.01) |
| B29C 45/00 | (2006.01) |
| B65D 1/12 | (2006.01) |
| B65D 25/38 | (2006.01) |
| B44D 3/12 | (2006.01) |
| B05B 13/02 | (2006.01) |
| B29K 21/00 | (2006.01) |
| B29K 101/00 | (2006.01) |

(Continued)

(52) U.S. Cl.
CPC ...... *B29D 99/0096* (2013.01); *B05B 13/0285* (2013.01); *B29C 45/0003* (2013.01); *B44D 3/127* (2013.01); *B65D 1/12* (2013.01); *B65D 25/38* (2013.01); *B65D 41/02* (2013.01); *B65D 83/40* (2013.01); *B29C 45/1676* (2013.01); *B29K 2021/00* (2013.01); *B29K 2101/00* (2013.01); *B29L 2031/565* (2013.01)

(58) Field of Classification Search
CPC ............ B65D 41/0485; B65D 41/0492; B65D 41/0478; B65D 83/40
See application file for complete search history.

(56) References Cited

U.S. PATENT DOCUMENTS 3,090,067 A * 5/1963 Weiby .................... B65D 51/24
15/236.02
3,428,220 A * 2/1969 Osrow .................... B65D 83/40
222/153.02

(Continued)

*Primary Examiner* — Andrew T Kirsch
(74) *Attorney, Agent, or Firm* — Ahab S. Ayoub

(57) ABSTRACT

A combination cap and work support system includes a lower section configured to connect to a container and an upper section configured to provide a desired support to an object. The combination cap and work support system may be utilized alone or in multiples to support an object above a work surface during a project. Configurations of the upper section generally include multiple apices separated by areas having a reduced height, and configured to support an object directly on the apices, or between the apices, to provide a desired combination of support and stability. The combination cap and work support system may be included as part of a kit in conjunction with a compatible container, such as a can of sprayable surface coating.

15 Claims, 6 Drawing Sheets

(51) Int. Cl.
    *B29C 45/16*     (2006.01)
    *B29L 31/56*     (2006.01)

(56) References Cited

U.S. PATENT DOCUMENTS

| | | | |
|---|---|---|---|
| 3,433,380 A * | 3/1969 | Kawchitch | B65D 41/0435 |
| | | | 215/329 |
| D246,895 S | 1/1978 | van der Heijden | |
| 4,232,785 A * | 11/1980 | Lucas | A45D 27/22 |
| | | | 132/289 |
| 4,469,235 A * | 9/1984 | Parker | B65D 41/0485 |
| | | | 215/295 |
| 5,147,052 A * | 9/1992 | Minette | B65D 50/068 |
| | | | 215/215 |
| 5,158,194 A * | 10/1992 | Sirgo | B65D 50/068 |
| | | | 215/215 |
| 5,992,668 A * | 11/1999 | Elliott | B65D 47/0804 |
| | | | 215/228 |
| D436,038 S | 1/2001 | Ruiz de Gopegui | |
| 6,209,748 B1 * | 4/2001 | Dunbar | B65D 51/24 |
| | | | 220/212 |
| D457,061 S | 5/2002 | Walters | |
| D538,651 S | 3/2007 | Nukuto | |
| D564,876 S | 3/2008 | Nickel | |
| D572,130 S | 7/2008 | Campbell | |
| D580,755 S | 11/2008 | Campbell | |
| D599,665 S | 9/2009 | Campbell | |
| D646,554 S | 10/2011 | Krohmer | |
| D654,808 S | 2/2012 | Gidlow | |
| D659,535 S | 5/2012 | Gidlow | |
| 8,347,811 B2 | 1/2013 | Bucci | |
| 8,622,256 B2 | 1/2014 | Campbell | |
| D700,060 S | 2/2014 | Trevisan | |
| D700,061 S | 2/2014 | Trevisan | |
| 2005/0017027 A1 | 1/2005 | Yerby | |
| 2008/0251525 A1* | 10/2008 | Fontaine | B44D 3/121 |
| | | | 220/756 |
| 2009/0283035 A1 | 11/2009 | Bucci | |
| 2011/0168730 A1* | 7/2011 | Alvares | B65D 7/34 |
| | | | 220/795 |
| 2012/0024855 A1* | 2/2012 | Smyers | B65D 1/34 |
| | | | 220/324 |
| 2012/0326376 A1 | 12/2012 | Krohmer | |
| 2013/0042728 A1* | 2/2013 | Wang | B25B 15/005 |
| | | | 81/436 |

* cited by examiner

COMBINATION CAP AND WORK SUPPORT SYSTEM

BACKGROUND OF INVENTION

Field of the Invention

The invention relates generally to an improved multi-functional cap for a can.

Background Art

Surface coatings such as paints, varnishes, sealants, and lubricants are commonly applied to objects via spray, brush or roller devices. Often, such coatings require significant drying times, and it is generally desirable to minimize contamination of a work surface or surrounding objects by unintended contact with such coatings. Wet surface coatings may also cause unintended and undesirable adhesion of an object to a work surface or other items, which may damage the work surface, the object, and/or the coating.

Additionally, access to all of the various surfaces of the object, during application of the surface coating, may pose a challenge. For example if an object to be coated is placed on a flat work surface, the lower edges and bottom side(s) of the object may be relatively inaccessible for application. In practice, this often means that such coatings must be applied in two phases, with the second occurring only after the first surfaces have dried and the object can be rotated for application to the other surfaces. This is generally an inefficient practice.

Tabletop support stand systems have been developed to support an object during application of a surface coating. Generally, it is desirable that such systems provide a high degree of stability, with a minimal degree of contact with the object surface, so as not to interfere with the application process, as well as to permit shortened drying times via air circulation around the drying surfaces.

One such system is the Painter's Pyramid® by K&M of VA, Inc. As shown in prior art FIG. 1A, such pyramidal designs have a single apex configuration with triangular sides. Certain configurations of the pyramidal stands are also configured to interlock in a manner that allows them to support non-planar objects such as rods or spheres between multiple pyramids. Other prior art approaches include the cone-like devices of, e.g., U.S. Design Pat. Nos. D642447, D668,933, and D672,222 by Bucci shown in FIG. 1B, and the cubic and spherical configurations disclosed in U.S. Pat. No. 8,347,811, also by Bucci.

Another example of a small work surface stand is the Bench Cookie® and attachable cones and bridges by Rockier®. As shown in prior art FIGS. 2A-2B these comprise a system of circular stackable pucks, used with a cone clip and/or bridge clip that provides a contact point for an object to be supported. The pucks and clip-on elements may be utilized in multiple configurations to provide similar functionality to that of the pyramid devices.

The prior art work stand devices described herein typically must be separately purchased and utilized in multiples as they are individually incapable of supporting an object. In addition to the costs involved in purchasing multiples of each, this limitation also requires that the supported object generally have a contact surface that is significantly greater than the diameter of the stand, as it must span multiple stands since such stands are not individually configured to support an object. Accordingly, there exists a need for an inexpensive small work surface stand capable of individually supporting a variety of objects and providing an increased stability, whether used alone or in multiples.

Many surface coatings, lubricants and other sprayable products, are stored, sold and applied via spray cans with the aid of aerosol propellants, or atomizer pumps. As shown in prior art FIG. 3, spray cans 310 are commonly cylindrical and the contents are generally dispersed by means of a spray assembly, comprising a dip tube 312 connected at its upper end to a valve or pump that is operated by means of an actuator, or button 314. The button will typically be operatively connected to the dip tube and include a nozzle for dispersal of the product.

To prevent accidental dispersal of the product, many spray cans include a cap to restrict access to the actuator, and/or a means of locking the actuator so that it may not be accidentally depressed. The cap may be in the form of a cover that completely encloses the actuator, or an open-style cap that surrounds a portion of the actuator to restrict accidental activation. Open-style caps are typically not removed from the can during use, but may be configured to rotate and lock the actuator, to prevent accidental activation of the actuator.

Other than their occasional use as containers for small loose items, spray can caps are generally single-purpose and are commonly disposed of along with the can. Thus, because large quantities of spray can caps are disposed of each year due to their limited utility, there exists a large and unmet need for a cap having additional utility, thereby creating additional value to the seller and consumer, and decreased environmental impact of disposal by encouraging the reuse of such caps.

SUMMARY OF INVENTION

In one aspect, the invention relates to a combination cap and work support system that is configured at a lower end to reversibly connect to a predetermined can, and at an upper end to provide a predetermined support system for supporting objects during application of a surface coating or other project.

The combination cap and work support system may be configured to be reversibly fastened to a work surface, and to support various types, configurations, quantities, and masses of objects. It will generally be configured with a plurality of apices, which may have flattened or pointed tops, for providing a desired contact surface with an object.

The combination cap and work support system may be packaged as a component of a kit, in conjunction with a can, such as a spray can, one or more weighted bases, and one or more combination cap and work support components.

Other aspects and advantages of the invention will be apparent from the following description and the appended claims.

DETAILED DESCRIPTION

Figure 1A:
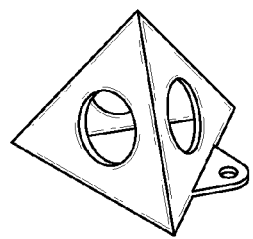
FIGS. 1A-1B show a prior art pyramid-style stand.
Figure 1B:
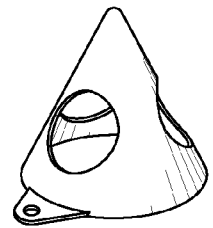
Figure 2A:
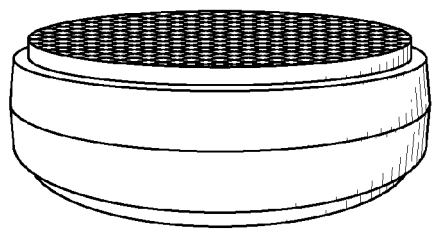
FIGS. 2A-2B show a prior art puck-style stand.
Figure 2B:
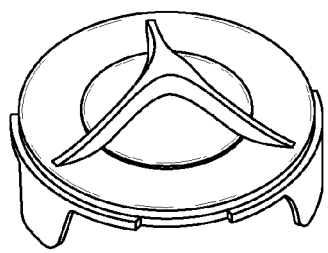
Figure 3:
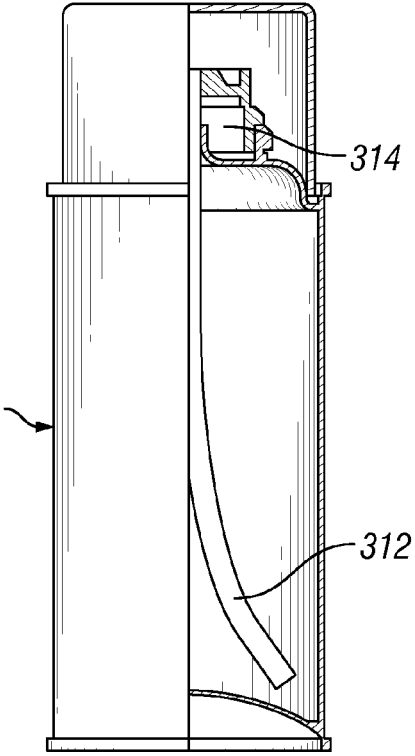
FIG. 3 shows a cutaway view of a prior art spray can and cap.
Figure 4:
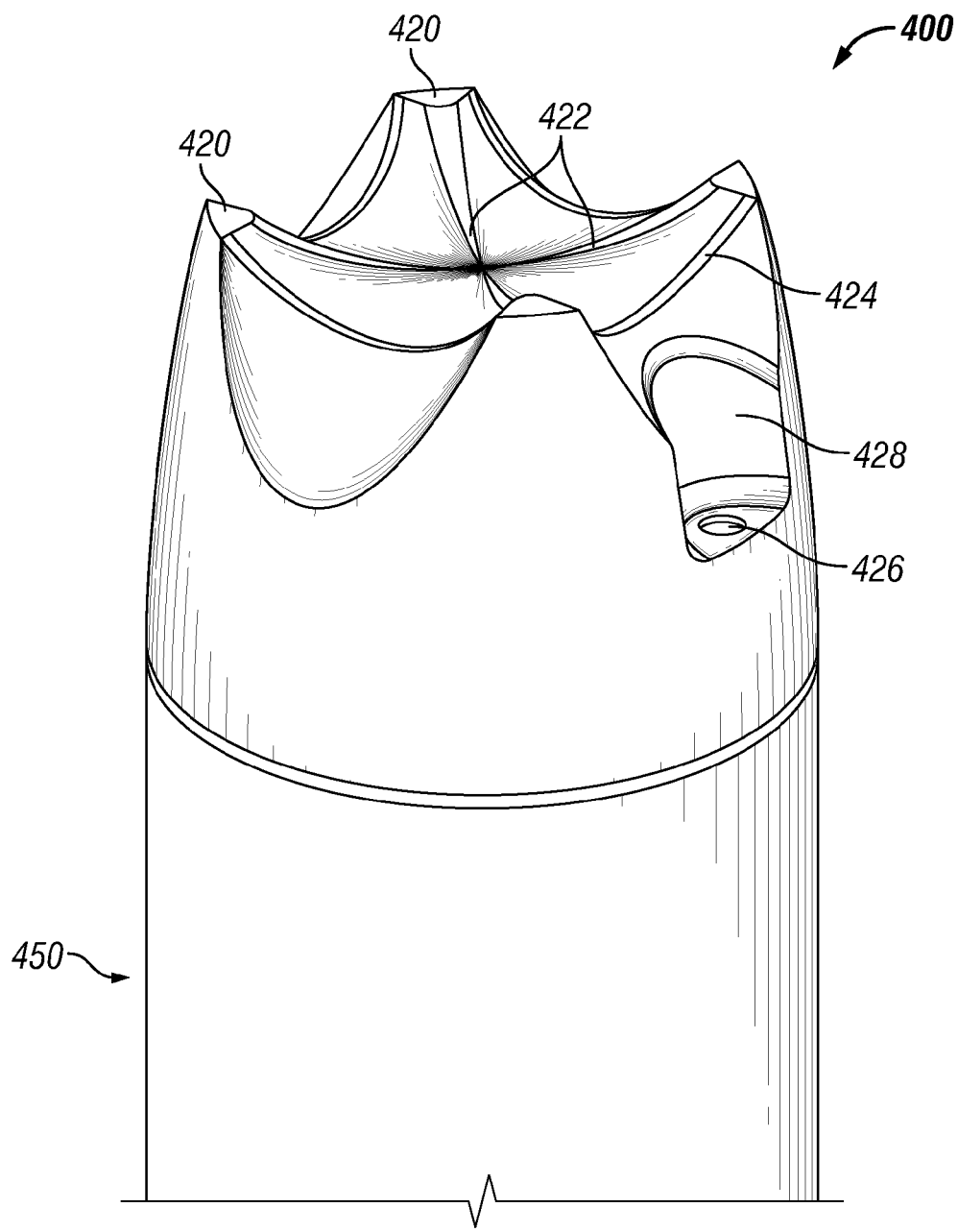
FIG. 4 shows one embodiment of an improved multifunctional cap, having four apices.

Embodiments of the invention fulfill multiple unmet needs by providing a novel and relatively inexpensive alternative to existing tabletop support systems, while providing a new and novel utility to spray can caps, and thus a lessened environmental impact. As shown in FIG. 4, one embodiment of a combination cap and work support, (henceforth described as an improved multifunctional cap or "IMC") 400 comprises a lower, generally circular base configured to reversibly connect to an upper rim of a can 450 or similar container. An upper region of the IMC 400 is configured to provide a number of support and stability features when the IMC 400 is disposed between a supported object and a work surface such as a table, workbench, or floor, as will be discussed in further detail below.

A number of apices 420 having a generally uniform height, may be configured with either a relatively flat top, or a pointed top. A relatively flat top advantageously provides greater stability to an supported object, while a pointed top provides a decreased contact area, as may be desirable when applying a surface coating to a supported object. Configurations may also include a textured surface, surface coatings and/or elastomeric materials to prevent slippage of a supported object. The areas between the apices 420 will generally be lower, and in certain embodiments may be configured to cradle an object, as will be further described in detail below.

In the embodiment of FIG. 4, the IMC 400 includes a plurality of radial ridges 422 extending from the apices 420. A predetermined set of radial ridges 422 may have a uniform configuration, thereby advantageously providing an increased stability to a supported object when disposed between the apices 420, and upon the radial ridges 422, as will be later shown and described.

Radial ridges 422 may extend from the center of the IMC 400 to the periphery, or alternatively may span only a portion of the radius of the IMC 400. For example, in the embodiment of FIG. 5, the IMC 500 may include a generally planar center 530, with radial ridges 522 projecting from a periphery thereof towards the periphery of the IMC 500.

For embodiments of the IMC 500 comprising a generally planar center 530, objects may be placed upon the apices 520 when a minimal contact surface is desired, or may be supported by their corners upon the planar center 530 when increased stability is desired. When placed upon the planar center 530, an object will be prevented from sliding by the radial ridges 522 which will restrict lateral movement of the object. Planar centers 530 also advantageously provide viable locations suitable for branding, including the application of stickers to the IMC, and/or integration of brand or product information into the IMC surface during manufacturing.

Figure 6:
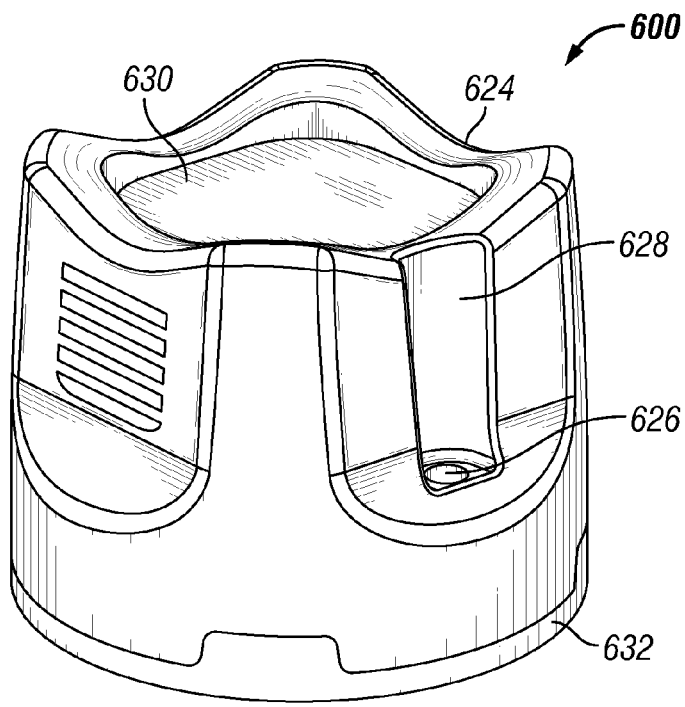
FIG. 6 shows one embodiment of an improved multifunctional cap, having a planar center and peripheral ridges.

Referring again to FIG. 4, in one embodiment, one or more peripheral ridges 424 may be disposed between a pair of apices 420, either in combination with radial ridges 422 as shown in FIG. 4, or as shown in the embodiment of FIG. 6, with only peripheral ridges 624. Ridges, in addition to the functional support characteristics described herein, may also advantageously provide additional strength and rigidity to the IMC, to lessen the likelihood of failure when supporting heavier objects.

Figure 5:
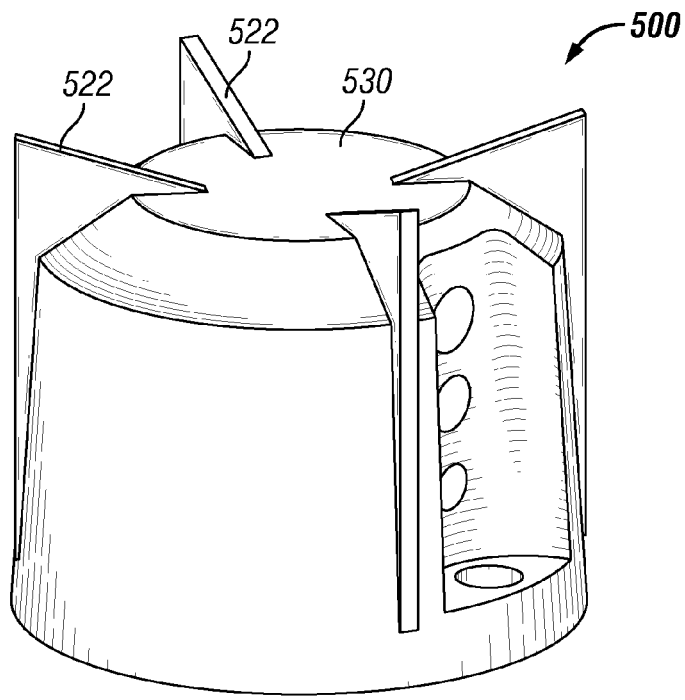
FIG. 5 shows one embodiment of an improved multifunctional cap, having a planar center, tapered apices, and radial ridges.

In ridged embodiments having a sloping ridge, one or more higher points of the ridge will form at least one apex. In one embodiment, the combination of ridges and apices combine to form a cradle configuration to advantageously support non-planar objects with increased stability by biasing such objects towards the center of the IMC. The cradle configuration may comprise curved ridges, as shown in FIG. 4, for more stably supporting objects with curved surfaces (e.g., rods or spheres), or a generally planar bottom, as shown in the embodiment of FIG. 5, for more stably supporting objects with planar surfaces, or a combination of the two. Ridges may be coated or formed of an elastomeric or other material based on an anticipated use.

In embodiments with multiple cradles, it may be advantageous to include combinations of cradles having an identical configuration to ensure that a supported object will be maintained in a horizontal orientation when supported by the cradles. For example, in an embodiment having four apices and four cradles disposed between, each pair of opposite cradles may have a matching configuration that differs from the matching configuration of the other pair of cradles. Such embodiments would advantageously provide different height placement locations for a supported object, and in some applications may be capable of supporting two perpendicularly-placed objects upon the same IMC, with one such object disposed in the higher pair of cradles, while the second such object is disposed perpendicularly upon the lower pair of cradles.

An additional advantage of such cradle configurations is the capability to support multiple objects disposed one above the other spanning multiple IMCs. For example, a plurality of rods may be supported by the cradle regions of multiple IMCs disposed on a work surface in a desired configuration, while planar objects may be disposed upon the apices of those same IMCs. Because the cradle of an IMC may serve as a location for joining multiple rods (e.g., dowels, pipes, etc.) at one or more angles relative to each other, multiple IMCs may be disposed to form a pattern of rods on a work surface with the capability to support multiple rods at each IMC. Conversely, the rods may instead be configured to maintain the IMCs in a desired pattern, for example, a square pattern of rods may be used to position and/or stabilize a set of IMCs in a square configuration, to support a larger planar object atop the multiple IMCs. In this regard, embodiments of the IMC may also include openings on sidewalls thereof to accommodate the ends of rods or other longitudinal objects.

Embodiments having cradle configurations may also be of particular benefit in stabilizing pipe fittings during the process of attachment, with such fittings disposed either directly above the IMC, or at locations between the IMCs. Additionally, the application to, and drying of, a pipe surface coating will be greatly assisted by such configurations which provide access to nearly the entire surface area of the pipe, while elevating it during the drying process to prevent the surface coating from sticking to a work surface.

Apices and cradles may advantageously be configured with specific angular orientations respective to other apices and cradles. For example, a three-cradle embodiment of an IMC, having three ridges, might be configured such that the cradles and/or ridges are offset 120-degrees from each other.

Similarly four-cradle configurations might be offset 90-degrees from each other. Such configurations allow for the precise orientation of a first supported object relative to a second supported object, and may also be utilized to orient a larger configuration of objects relative to one another by utilizing multiple IMCs having the desired angular characteristics. In one embodiment, the angles will be indicated upon a surface of the IMC.

Embodiments of the IMC may also include one or more fastening points, such as an indent or hole. As shown in FIGS. 4 and 6, fastening points 426, 626 are configured to accommodate the positioning and passage of a fastener such as a nail or screw at predetermined locations, without excessive damage to the IMC. Fastening the IMC to a work surface will advantageously increase the stability of the IMC in use. Additionally, these permit the IMC to be stably affixed to sloped or vertical surfaces. In one or more embodiments, the cradles, and/or adjacent sidewall configurations will be formed to stably support an object when the IMC is fastened to a vertical surface, and the object is at least partially disposed within the cradle.

In various embodiments, such fastening points 426, 626 will be disposed at the bottom of a groove 428, 628 to advantageously stabilize and orient a fastener during deployment. In one embodiment, fastening points 426, 626 are disposed in a lower half of the IMC, to advantageously permit the use of shorter fasteners and/or greater penetration into a work surface. Grooves 428, 628 may be larger than the fastening points 426, 626 to advantageously accommodate and guide a screwdriver or drill during the process of deploying a fastener.

Embodiments of the IMC may also be inter-connectible via configurations of tabs, tongue and groove configurations, male/female protrusions or any other configurations known in the art. Such inter-connectivity will advantageously permit a desired geometric pattern of IMCs. Such tabs and other interconnectivity elements may be configured to function as fastening points by accommodating a fastener. For example, the ends of a staple may be each disposed within the fastening points of two neighboring IMCs to maintain the IMCs in close proximity to one another, possibly while also fastening the IMCs to a work surface.

Embodiments of the IMC may also be configured with a safety squeeze lock, and/or any other child safety mechanism known in the art. In one embodiment, a gap may be disposed along the lower periphery to advantageously permit the insertion of a tool between the IMC and an operatively connected can, to facilitate removal of the IMC from the can.

Embodiments of the IMC may comprise any material or combinations thereof known in the art. These may typically include, but are not limited to, various plastics, metals, and elastomers. In one embodiment, the IMC may be formed of plastic in combination with an elastomeric material 632 disposed at a lower end to advantageously provide a greater stability to the IMC, as well as some shock-absorbing characteristics. Such multi-material configurations may be manufactured via dual-shot/multi-shot molds. Other elastomeric surfaces may be added to various locations of the IMC, including the apices, to e.g., increase stability, decrease displacement of a supported object, and improve gripping surfaces for a user. Wall thickness of an IMC, or various components thereof, may vary and may be selected based upon a desired durability, cost, and/or capacity. Embodiments of the IMC, particularly those configured to nest, may be manufactured without any negative draft angles to advantageously facilitate removal from the mold.

Embodiments of the IMC may also be constructed of multiple, separately formed components. For example, a plastic body may be operatively connected to an elastomeric base and/or elastomeric elements may be operatively connected to apices at predetermined locations on the plastic body. In one embodiment, holes or slots may be formed in the apices, to operatively connect tips configured to have a desired contact characteristic with an object. For example the tips may be elastomeric, pointed, round, textured, and/or replaceable or interchangeable. Alternatively, nails, toothpicks, or other elongated objects may be positioned in holes disposed in the apices, to facilitate a minimal contact area and increased accessibility to a supported object.

Embodiments of the apices may also include or be compatible with roller tips or low-friction tips to aid the user in moving an object supported thereby. For example, if a surface coating were being applied to a spherical object supported upon an IMC, and the user wished to rotate the object without lifting it from the IMC. Such embodiments may advantageously provide a user the option to "upgrade" an IMC to make it more suitable for a desired application.

In one embodiment, an IMC may be configured at a lower end to rotate, such that the upper section of the IMC may be rotatable relative to the lower section. Such rotation may allow the IMC to rotate when operatively connected to a can or a weighted base. Other embodiments of the IMC may be configured to operatively connect to a separate base element, and such base elements may be weighted and/or rotatable.

Other materials and/or coatings may include those intended to correspond to an anticipated use of a particular spray product. For example, IMCs intended for use with a hair product may comprise a heat-resistant material or coating for supporting a heated flatiron or hair dryer on a surface during use, to advantageously prevent heat damage to the surface. Cradles and other elements of such an IMC may be configured to particularly accommodate such devices in a desired orientation. For example, one such IMC may be configured to retain a flatiron in a closed position at a particular angle within a cradle thereof.

Figure 7A:
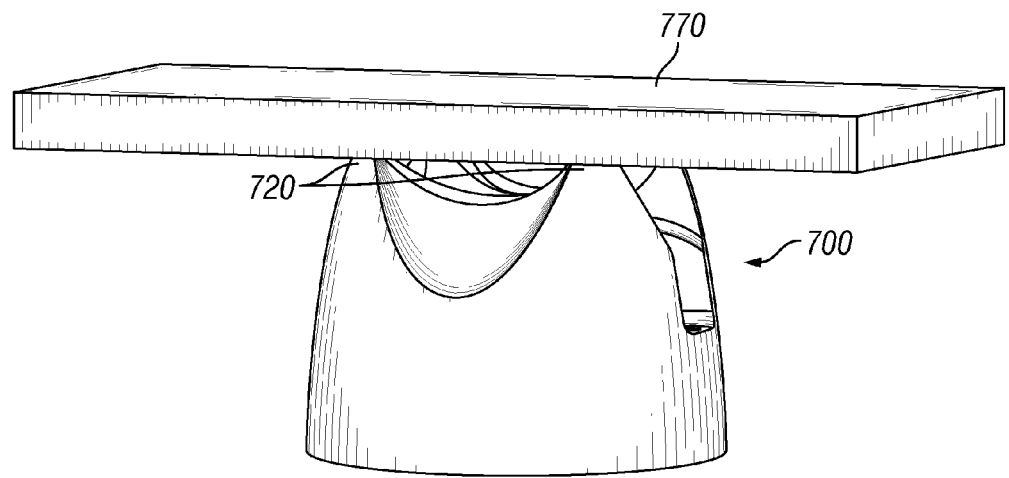
FIG. 7A shows one embodiment of an improved multifunctional cap, in use supporting a single object.
Figure 7B:
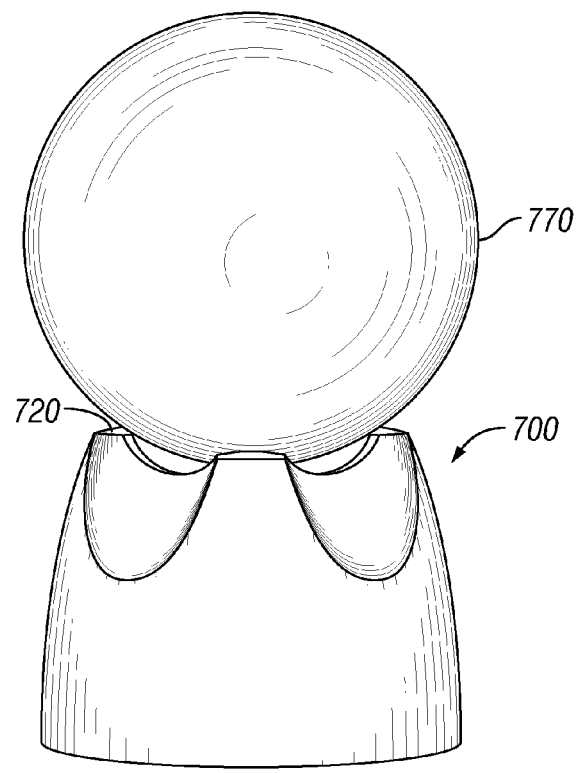
FIG. 7B shows one embodiment of an improved multifunctional cap, having three apices, in use supporting a spherical object.

One significant advantage of embodiments of the IMC, is the capability to individually support an object with only a single unit. Whereas prior art small work surface stands generally include only a single peaked or flat contact surface, making it difficult to balance an object thereupon, embodiments of the IMC which include a plurality of such surfaces may be used individually to support an object, as shown in FIGS. 7A and 7B. To advantageously increase such capability, embodiments of the IMC 700 may be configured with at least three apices 720 disposed some distance apart in a pattern selected to stably distribute the load of an object 770 upon the IMC 700. In one embodiment, such distance will be at least one-third of the diameter of the IMC 700. For example, if the diameter of the IMC 700 is 3", the centers of the upper surfaces of the apices 720 will be disposed at least 1" apart.

Figure 7C:
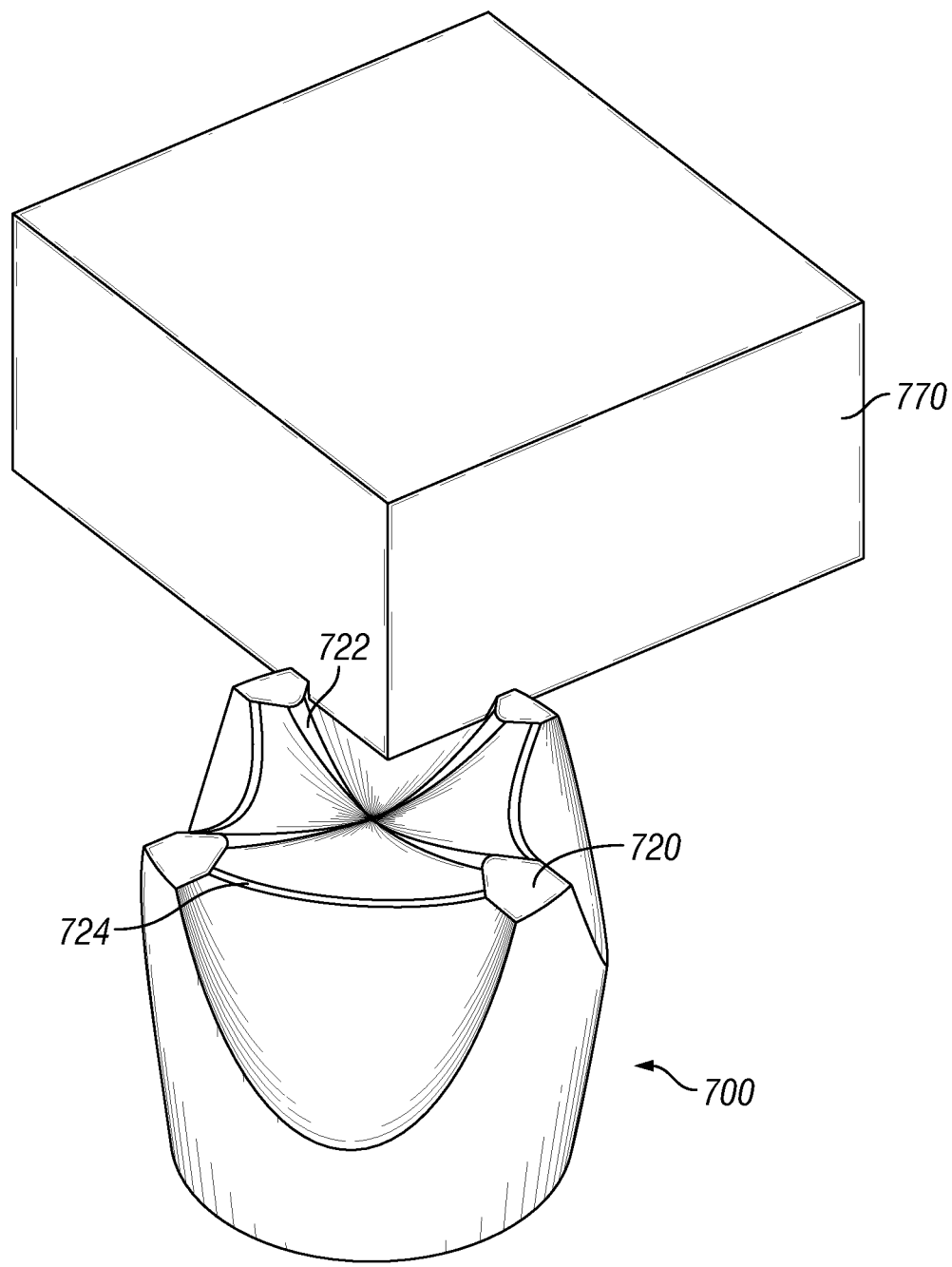
FIG. 7C shows one embodiment of an improved multifunctional cap, in use supporting a corner of an object between apices.

As shown in FIG. 7C, the corner of a supported object 770 may be supported by the cradle and/or central region of the IMC 700 and when positioned between the apices 720 will advantageously be prevented from slipping laterally, as the apices 720 provide lateral stability.

The various configurations of ridges described herein may have a relatively planar surface, or include a desired curvature. Furthermore, such ridges may be relatively horizontal, or sloped. Horizontal configurations provide increased contact areas for supporting flat objects, while sloped configurations may provide a desired bias to a non-planar object, generally toward the center of the IMC, to prevent the object from rolling off of the IMC when supported thereby.

Figure 8:
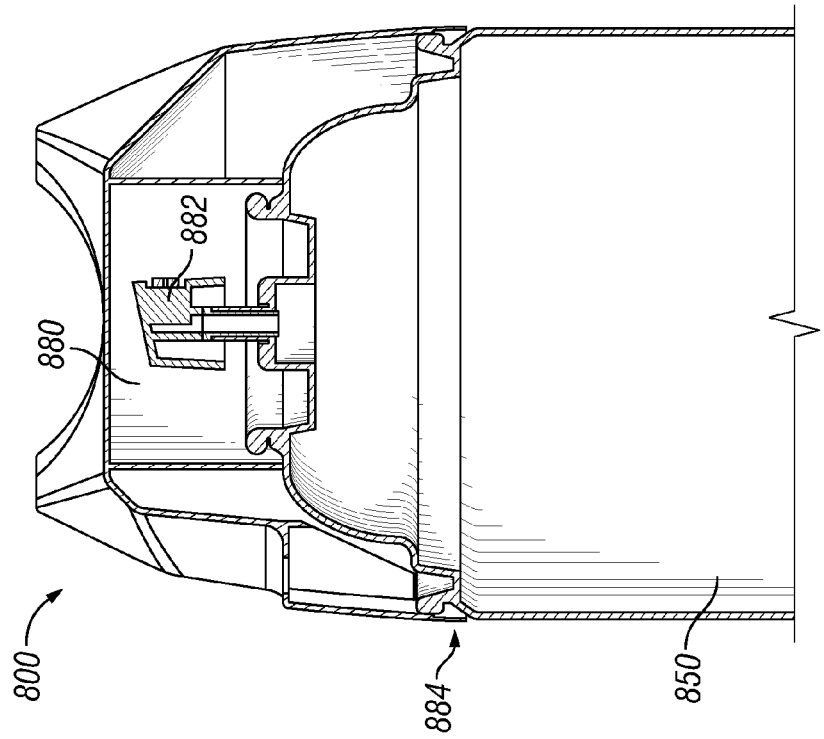
FIG. 8 shows one embodiment of an improved multifunctional cap, operatively connected to a spray can.

As shown in cross-section view of FIG. 8, embodiments of the IMC 800 will generally have a substantially hollow interior, often configured with various elements such as an isolation cavity 880 to accommodate and isolate an actuator 882 of an operatively-connected can 850, as well as a number of support walls and ridges to lend strength and rigidity to the IMC 800.

The lower section of the IMC 800 may comprise one or more connection elements 884 for operatively and reversibly connecting to a can 850 in a predetermined manner. Such connection elements 884 may be of any type known in the art and may be located at discrete points along the circumference, or along the entire circumference, of the IMC 800. The connection elements 884 may comprise threads, clips and other friction elements, or any other configurations known in the art for achieving such an operative connection. Connection elements 884 may be disposed on internal or external surfaces of the IMC 800, or a combination thereof. In various embodiments, the lower edge of the IMC 800 will be configured to rest stably upon a flat work surface. Connection elements 884 may also be utilized to operatively connect an IMC 800 to a weighted base to provide an increased stability in use.

Figure 9:
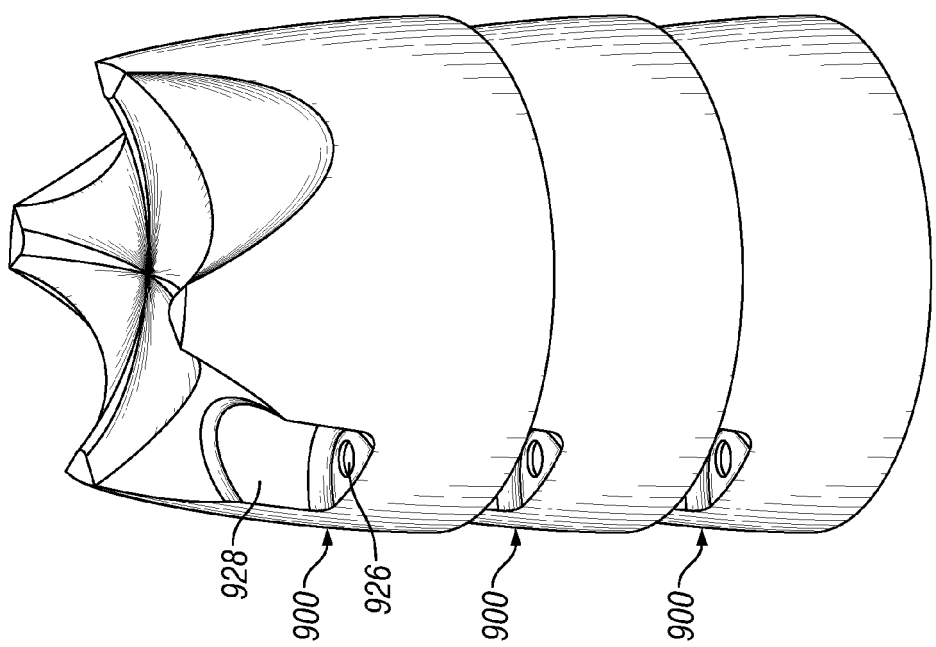
FIG. 9 shows one embodiment of an improved multifunctional cap, in a nested configuration.

As shown in FIG. 9, embodiments of the IMC 900 may be configured to taper from a wider lower region to a narrower upper region to advantageously permit nesting and stacking of multiple IMCs 900. Various elements, including ridges 920, grooves 928, etc., will similarly taper to facilitate tighter nesting. Nesting and stackability provide numerous advantages including easier storage, connection of multiple IMCs to a single can to form a kit or achieve a desired height, and deployment of stacked IMCs on a work surface to achieve a desired support height and/or combination of desired supported heights for supported objects.

In one embodiment, an outer surface of the IMC will be configured to reversibly connect to an inner surface of a second IMC, to advantageously provide a reversible locking configuration of multiple IMCs, permitting a stack of IMCs to be used and moved as a unit. This can be accomplished by utilizing connection elements configured to also connect to a can, or by means of an independent set of connection elements. Such connection elements may be frictional, threaded, or of any other type known in the art.

In one embodiment, an upper section of the IMC may be configured to operatively connect to a lower section of a can, thereby advantageously permitting cans to be stacked upon one another, in a stable manner.

While the IMC may be configured with any number of apices, 3-4 such apices may advantageously provide a desired combination of single-unit functionality in combination with minimal contact surfaces (reduced obstruction). It may also be advantageous to ensure that all IMCs from a particular source have similar or identical characteristics, to ensure interoperability, including uniform height of apices and/or cradle configurations, and inter-connectible connection elements.

As used herein, the term "apex" (plural "apices") shall mean a high point relative to surrounding structure. While the highest point(s) of an IMC will generally be apices, additional apices may be formed at a secondary height, so long as they are the highest points relative to immediately surrounding structure. For example, a first cradle may terminate at a first set of apices at either end, while a second cradle may terminate at a second set of apices at either end, and the first and second sets of apices may have differing heights. Other meanings of the term within the spirit of the invention may also apply.

As used herein, the term "radial" as applied to a ridge, has a preferred meaning of extending along at least a portion of an imaginary line extending from the center of the IMC toward a point on the periphery of the IMC. As used herein, the term "peripheral" as applied to a ridge, has a preferred meaning of being generally aligned in a direction that corresponds to an peripheral border of the IMC. The terms "circumference," "diameter," and variations thereof, as used in this application, may encompass non-circular applications corresponding to the concepts of a perimeter, or length, of non-circular elements, when such is clearly indicated by accompanying descriptive language. The scope of these terms may be further defined by exemplary reference elements in the drawings.

The terms "comprising," "including," and "having," as used in the claims and specification herein, indicate an open group that includes other elements or features not specified. The terms "a," "an" and the singular forms of words include the plural form of the same words, and the terms mean that one or more of something is provided. The terms "at least one" and "one or more" are used interchangeably.

The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of an embodiment.

While the embodiments disclosed herein are generally of the closed-style cap configuration, many of the novel elements disclosed herein may be deployed in open-style cap configurations. Furthermore, many novel features disclosed herein may be utilized with caps and lids for containers other than spray cans. While generally disclosed as having a circular base, embodiments of the invention may include a square base or any other shape known in the art. IMCs may have an overall cylindrical, oval, rectangular, square or other shape, and such may vary among different sections of an IMC. Embodiments of the IMC may also include an upper section that is hingeably connected to a lower section to permit access to an enclosed actuator without removal of the IMC, when operatively connected to a spray can.

While generally described herein as a cap for a can, embodiments of the IMC may be configured for use with various other types of containers. Embodiments of the IMC may also include one or more openings disposed in an outer wall thereof, configured to permit the entry of a rod or similar element. In one embodiment, such openings shall be offset from the cradles such that objects supported by the openings would have a different orientation than those supported by the cradles, thereby advantageously providing an increased selection of orientations for supported objects.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An improved multifunctional cap, comprising:
    a lower section configured to reversibly connect to a predetermined can configuration, and;

an upper section comprising a plurality of substantially hollow ridges extending downwardly from a plurality of spaced apices, wherein at least one apex selected from the plurality of spaced apices forms the highest point(s) on the improved multifunctional cap, and wherein the plurality of substantially hollow ridges (a) includes at least one ridge having a concave external upper surface, and (b) comprises at least one cradle configuration.

2. The improved multifunctional cap of claim 1, wherein a plurality of the apices comprises an identical configuration of one selected from a tapered top and a flat top.

3. The improved multifunctional cap of claim 1, wherein the plurality of substantially hollow ridges comprises at least one radial ridge and at least one peripheral ridge.

4. The improved multifunctional cap of claim 1, further comprising at least one fastening point disposed in an external surface thereof, and configured to allow passage of a fastener vertically through the external surface.

5. The improved multifunctional cap of claim 4, wherein the at least one fastening point is disposed at a lower end of a groove formed in an outer surface thereof.

6. The improved multifunctional cap of claim 1, wherein the lower section and the upper section comprise a single molded unit.

7. The improved multifunctional cap of claim 1, comprising at least three apices separated from each other by a distance no less than one-third of the diameter of the improved multifunctional cap, such diameter being measured at the widest point of the improved multifunctional cap.

8. The improved multifunctional cap of claim 7, wherein the distance is the same between each of the at least three apices.

9. The improved multifunctional cap of claim 1, further comprising at least one horizontal planar surface disposed between two apices, the horizontal planar surface being disposed at a height that is less than that of the two apices.

10. The improved multifunctional cap of claim 9, wherein the horizontal planar surface comprises an elliptical surface area.

11. The improved multifunctional cap of claim 1, further comprising at least one connection element configured to reversibly connect to at least one selected from the predetermined can configuration, and a second improved multifunctional cap.

12. The improved multifunctional cap of claim 1, wherein an interior of the lower section, extending at least partly into an interior of the upper section, is configured to accept at least part of an upper section of a second identical and similarly-oriented improved multifunctional cap, such that a plurality of improved multifunctional caps may be stacked in at least a partially-nested configuration.

13. A method for manufacturing an improved multifunctional cap, comprising:
utilizing a multi-shot mold and a plurality of materials,
forming an upper section comprising at least one apex and at least one substantially hollow ridge having a concave surface sloping towards a lower section of the improved multifunctional cap; and
integrating at least one connection element in a bottom portion of the lower section.

14. The method of claim 13, wherein the plurality of materials includes at least one elastomeric material, and at least one plastic.

15. The method of claim 14, wherein the at least one elastomeric material forms a surface of the at least one apex.

* * * * *